United States Patent
Starzengruber et al.

(10) Patent No.: US 10,688,584 B2
(45) Date of Patent: Jun. 23, 2020

(54) PORTABLE WELDING ARRANGEMENT AND METHOD FOR OPERATING A PORTABLE WELDING ARRANGEMENT, SAID ARRANGEMENT COMPRISING A STORAGE BATTERY CONTROLLED IN ACCORDANCE WITH THE OPERATING MODE OF WELDING APPARATUS

(71) Applicant: Fronius International GmbH, Pattenbach (AT)

(72) Inventors: Andreas Starzengruber, Bad Wimsbach-Neydharting (AT); Alexander Speigner, Kirchdorf an der Krems (AT); Juergen Binder, Scharnstein (AT)

(73) Assignee: Fronius International GmbH, Pettenbach (AT)

(*) Notice: Subject to any disclaimer, the term of this patent is extended or adjusted under 35 U.S.C. 154(b) by 464 days.

(21) Appl. No.: 14/419,532

(22) PCT Filed: Jul. 23, 2013

(86) PCT No.: PCT/AT2013/050142
§ 371 (c)(1),
(2) Date: Feb. 4, 2015

(87) PCT Pub. No.: WO2014/022870
PCT Pub. Date: Feb. 13, 2014

(65) Prior Publication Data
US 2015/0183043 A1  Jul. 2, 2015

(30) Foreign Application Priority Data
Aug. 10, 2012 (AT) .............................. A 50316/2012

(51) Int. Cl.
*B23K 9/10* (2006.01)
*H02J 5/00* (2016.01)
(Continued)

(52) U.S. Cl.
CPC .............. *B23K 9/1043* (2013.01); *B23K 9/32* (2013.01); *B23K 37/0294* (2013.01); *H02J 5/00* (2013.01);
(Continued)

(58) Field of Classification Search
CPC .... B23K 37/0294; B23K 9/1043; B23K 9/32; B23K 9/1081; B23K 9/1075; H02J 7/0044; H02J 7/007; H02J 7/02; Y02B 40/90
(Continued)

(56) References Cited

U.S. PATENT DOCUMENTS 3,564,194 A * 2/1971 Pease .................... B23K 9/1012
219/108
4,561,059 A * 12/1985 Davis .................... B23K 9/073
219/130.21
(Continued)

FOREIGN PATENT DOCUMENTS

CN          102205455 A      10/2011
CN          202212707 U       5/2012
(Continued)

OTHER PUBLICATIONS

International Search Report of PCT/AT2013/050142, dated Jan. 3, 2014.
(Continued)

*Primary Examiner* — Ibrahime A Abraham
*Assistant Examiner* — Frederick F Calvetti
(74) *Attorney, Agent, or Firm* — Collard & Roe, P.C.

(57) ABSTRACT

A portable welding arrangement includes a welding apparatus having a storage battery, a power source, a welding
(Continued)

control means and a connection for a welding torch. The operating mode of the welding apparatus can be changed between a standby mode and a welding mode. The portable welding arrangement includes a charging apparatus that can be connected to a power supply network and to the welding apparatus and has a charge controller for charging the storage battery. In a method for operating such a portable welding arrangement, for optimum charging of the battery, the charge controller of the charging apparatus is designed to control the charge of the accumulator of the welding apparatus in accordance with the operating mode of the welding apparatus.

20 Claims, 4 Drawing Sheets

(51) Int. Cl.
  B23K 37/02 (2006.01)
  B23K 9/32 (2006.01)
  H02J 7/00 (2006.01)
(52) U.S. Cl.
  CPC ............ *H02J 7/007* (2013.01); *H02J 7/0044* (2013.01); *Y02B 40/90* (2013.01)
(58) Field of Classification Search
  USPC ................. 219/133, 134; 320/152, 157–159, 320/162–164
  See application file for complete search history.

(56) References Cited

U.S. PATENT DOCUMENTS

| | | | | |
|---|---|---|---|---|
| 5,650,710 | A * | 7/1997 | Hotta | B60L 3/0046 320/128 |
| 6,225,596 | B1 * | 5/2001 | Chandler | B23K 9/1056 219/130.1 |
| 6,818,860 | B1 * | 11/2004 | Stava | B23K 9/1006 219/130.1 |
| 7,615,969 | B2 * | 11/2009 | Meng | H02J 7/0091 320/150 |
| 9,119,023 | B2 * | 8/2015 | Dina | H04L 12/6418 |
| 2005/0230372 | A1 * | 10/2005 | Ott | B23K 9/1087 219/132 |
| 2006/0027548 | A1 * | 2/2006 | Albrecht | B23K 9/1006 219/133 |
| 2006/0037953 | A1 * | 2/2006 | Matthews | B23K 9/1006 219/133 |
| 2007/0080154 | A1 * | 4/2007 | Ott | B23K 9/095 219/132 |
| 2007/0114216 | A1 * | 5/2007 | Ott | B23K 9/1087 219/132 |
| 2007/0181547 | A1 * | 8/2007 | Vogel | B23K 9/1081 219/130.1 |
| 2007/0215585 | A1 * | 9/2007 | O'Connor | B23K 9/1043 219/130.1 |
| 2008/0024089 | A1 * | 1/2008 | Meng | H02J 7/0091 320/128 |
| 2008/0210676 | A1 * | 9/2008 | Lambirth | B23K 9/10 219/130.1 |
| 2008/0264918 | A1 * | 10/2008 | Helf | B23K 9/32 219/133 |
| 2008/0314885 | A1 * | 12/2008 | Hutchison | B23K 9/1043 219/133 |
| 2009/0008368 | A1 * | 1/2009 | Beeson | B23K 9/1006 219/121.39 |
| 2009/0008374 | A1 * | 1/2009 | Fosbinder | B23K 9/1006 219/130.21 |
| 2009/0057285 | A1 * | 3/2009 | Bashore | B23K 9/32 219/130.1 |
| 2009/0230941 | A1 * | 9/2009 | Vogel | B23K 9/091 323/305 |
| 2009/0298024 | A1 * | 12/2009 | Batzler | B23K 9/32 434/234 |
| 2010/0066309 | A1 * | 3/2010 | Labrunie | H01M 10/4264 320/141 |
| 2010/0155384 | A1 * | 6/2010 | Albrecht | B23K 9/1006 219/133 |
| 2010/0187210 | A1 * | 7/2010 | Albrecht | B23K 9/1006 219/133 |
| 2010/0320183 | A1 * | 12/2010 | Borchert | B23K 9/1006 219/130.1 |
| 2011/0006046 | A1 * | 1/2011 | Albrecht | B23K 9/1006 219/133 |
| 2011/0114607 | A1 * | 5/2011 | Albrecht | B23K 9/1006 219/108 |
| 2011/0290765 | A1 * | 12/2011 | Albrecht | B23K 9/00 219/78.01 |
| 2012/0006792 | A1 * | 1/2012 | Rozmarynowski | B23K 9/327 219/74 |
| 2012/0056581 | A1 | 3/2012 | Kim | |
| 2012/0074116 | A1 * | 3/2012 | Matthews | B23K 9/1006 219/133 |
| 2012/0175356 | A1 * | 7/2012 | Magerl | B23K 9/32 219/130.21 |
| 2012/0175357 | A1 * | 7/2012 | Magerl | B23K 9/1043 219/137 R |
| 2013/0119939 | A1 * | 5/2013 | Yonezawa | H02J 7/00 320/134 |
| 2013/0327751 | A1 * | 12/2013 | Salsich | B23K 9/1043 219/137.71 |
| 2014/0054276 | A1 * | 2/2014 | Albrecht | B23K 9/1006 219/133 |
| 2014/0239912 | A1 * | 8/2014 | Hanada | H02J 7/00 320/134 |
| 2014/0263245 | A1 * | 9/2014 | Ulrich | B23K 9/1075 219/133 |
| 2015/0069975 | A1 * | 3/2015 | Farah | H02J 7/0019 320/150 |
| 2015/0314387 | A1 * | 11/2015 | Starzengruber | B23K 9/1043 219/130.33 |
| 2015/0350821 | A1 * | 12/2015 | Dina | H04L 12/6418 455/41.2 |
| 2018/0117698 | A1 * | 5/2018 | Schartner | B23K 9/1012 |

FOREIGN PATENT DOCUMENTS

| | | |
|---|---|---|
| EP | 1 535 691 A2 | 6/2005 |
| GB | 2 316 244 A | 2/1998 |
| JP | H05-137270 A | 6/1993 |
| JP | 2003-028939 A | 1/2003 |
| KR | 2009-0116046 A | 11/2009 |
| WO | 2007/094896 A1 | 8/2007 |

OTHER PUBLICATIONS

Austrian Office Action in A 50316/2012-1, dated Jun. 20, 2013, with English translation of relevant parts.

* cited by examiner

PORTABLE WELDING ARRANGEMENT AND METHOD FOR OPERATING A PORTABLE WELDING ARRANGEMENT, SAID ARRANGEMENT COMPRISING A STORAGE BATTERY CONTROLLED IN ACCORDANCE WITH THE OPERATING MODE OF WELDING APPARATUS

CROSS REFERENCE TO RELATED APPLICATIONS

This application is the National Stage of PCT/AT2013/050142 filed on Jul. 23, 2013, which claims priority under 35 U.S.C. § 119 of Austrian Application No. A 50316/2012 filed on Aug. 10, 2012, the disclosure of which is incorporated by reference. The international application under PCT article 21(2) was not published in English.

The invention refers to a portable welding arrangement comprising a welding apparatus having a storage battery, a power source, a welding control unit and a connection for a welding torch, wherein the operating mode of the welding apparatus can be changed between a standby mode and a welding mode, and comprising a charger that can be connected to a power supply network and to the welding apparatus and has a charge controller for charging the storage battery.

The invention also relates to a method for operating a portable welding arrangement comprising a welding apparatus having storage battery, a power source, a welding control unit and a connection for a welding torch, wherein the operating mode of the welding apparatus is changed between a standby mode and a welding mode, wherein the storage battery of the welding apparatus, for the charging thereof, will be connected to a charger connected to a power supply network.

For places at which a welding shall be carried out and which are particularly difficult to access, as e.g. on a scaffold, or also for weldings for which a direct supply with electric energy is inadmissible, as e.g. in a tank, boiler or the like, the use of portable, battery-powered welding apparatuses is particularly advantageous or essential. Most of the battery-operated welding apparatuses of the state of the art can be used exclusively when running on battery power, and after the performance of the welding process a charging of the battery can be carried out by means of corresponding chargers. A so-called hybrid mode in which the portable welding apparatus can also be connected to the power supply network or grid—where admissible and possible—and in which the portable welding apparatus can be charged during the performance of the welding process, is not known.

WO 2007/094896 A1 refers to a battery-powered welding apparatus with a preferably removable battery and a charging apparatus comprising a special control device.

EP 1 535 691 A2 describes a portable welding apparatus with interchangeable batteries and a regulating or control device for the control of the desired output voltage in dependence on the desired welding process. No information with regard to the charging apparatus for the charging of the battery is given in said document.

The object of the present invention is to develop a portable welding arrangement as mentioned above which comprises a welding apparatus and a charger, as well as to develop a method for operating such a portable welding arrangement, by means of which a grid-connected operation as well as also an off-grid operation of the welding apparatus is possible and by means of which an optimum or efficient charging of the storage battery, i.e. the battery, is enabled.

The object of the invention is solved by a portable welding arrangement of the above-mentioned kind, wherein the charge controller of the charger is designed to control the charge or charging of the storage battery of the welding apparatus in accordance with the operating mode of the welding apparatus. Thus, according to the invention, the charge controller of the charger provides that the charging of the storage battery of the welding apparatus can be carried out in different manners depending on the operating mode of the welding apparatus. In this connection it has to be stated that, basically, it is distinguished between a standby mode and a welding mode, wherein in the standby mode no welding process is carried out, which means that there is no arc burning, and in the welding mode the welding process is carried out, which means that there is an arc burning between the welding torch and the work piece. The distinction of the operating mode could possibly also be made in dependence on the welding current, and an operation of the welding torch in which there is an arc burning, but only a very low welding current is flowing, could be considered to virtually belong to the standby mode. In the standby mode the storage battery of the welding apparatus will be charged in a different manner than in the actual welding mode during which a relatively high welding current flows. In any case it is of importance that the charging of the storage battery, provided said charging is possible for the portable welding arrangement, is carried out in different manners depending on the operating mode of the welding apparatus.

For the performance of the charging of the storage battery of the welding apparatus in accordance with the operating mode of the welding apparatus it is advantageous if the welding control unit is connected to the charge controller of the charger via a communication link. Via said communication link between the welding control unit and the charge controller, the charge controller of the charger receives the required information, as for instance regarding the operating mode of the welding apparatus. The term "communication link" comprises wireless links as well as also wire- or line-bound links or modulation methods which modulate the required information concerning the operating mode of the welding apparatus via the supply lines.

Advantageously, the charge controller of the charger is also designed to control the charge or charging of the storage battery of the welding apparatus in accordance with the type of the storage battery. Thus, the charge or charging can be adapted optimally to the type of the used storage battery. The recognition of the type of the used storage battery by the charge controller of the charger can be carried out in various manners with electronic codings (for instance by different voltage levels) or with mechanical codings or with reading out corresponding information from a memory which is comprised in the storage battery. A welding apparatus of a portable welding arrangement can for instance be equipped with different storage batteries with regard to the charging capacity, and the charging method can be adapted correspondingly to the type of the storage battery.

In accordance with a further feature of the invention it is provided that the charge controller of the charger is connected to a memory for storing at least one charging characteristic and is designed to control the charge or charging of the battery in accordance with the at least one specified charging characteristic in the standby mode of the welding apparatus and in accordance with a maximum charging current in the welding mode of the welding apparatus. Thereby it is guaranteed that the charge of the battery of the welding apparatus will be charged in the standby mode—or in the welding mode when there is a particularly low welding current—in accordance with a predetermined charging characteristic, whereas in the welding mode, when a relatively high welding current is withdrawn from the battery, the charging is carried out with a maximum charging current. Thereby an optimum charging of the battery can be carried out in accordance with the respective operating mode of the welding apparatus, and a conservation of the battery as well as a charging time as short as possible can be achieved. Moreover, also a maximum support of the performance or output in the welding mode is to be guaranteed.

It is also advantageous if in the welding apparatus a battery controller is provided for monitoring the state of charge of the battery, said battery controller being connected to the welding control unit via a communication link. Thus, information on the state of charge of the battery can be transmitted to the welding control unit, wherein said information can be taken into consideration in the control of the welding apparatus. As already mentioned above, the communication link can be implemented in a wireless manner as well as also in a wire- or line-bound manner or by modulation on present wires or lines used for other purposes.

It is advantageous if the welding apparatus comprises a display for displaying the state of charge of the battery. Via said display of the state of charge the welder receives important information on the fact whether he can still perform intended welding processes with the present amount of charge of the battery.

When a deactivation device for turning the welding apparatus off after the exceeding of a specified period of time in the standby mode is formed in the welding apparatus, the energy of the battery can be saved by the fact that the welding apparatus is turned off correspondingly. Via a corresponding wake-up cycle and after the operation of an operating element, the actuation of the welding torch, or the plugging-in or connecting of the charger, the welding apparatus can be activated once again.

If a temperature sensor for measuring the temperature of the battery is provided, said temperature sensor being connected to the battery controller, a temperature-dependent control of the battery, and, via the above-mentioned communication links, also a corresponding control of the charge or charging of the battery in accordance with the temperature can be carried out.

The charging of the battery can for instance be configured in various manners in accordance with the surrounding temperature. On the other hand, also an overheating of the battery can be detected by the temperature sensor in due time, and corresponding signals can be output or corresponding measures can be taken.

The charger of the portable welding arrangement can also be integrated in the welding apparatus. This increases the weight of the portable welding apparatus, but facilitates also the handling thereof, as the connection between the charger and the welding apparatus has no longer to be established manually. When the charger is integrated in the welding apparatus, it is advantageous if the charge controller and the welding control unit, as well as also the battery controller at most, are combined in one common control unit which can be formed by a corresponding micro processor or micro controller.

In order to increase the service life of the battery in the welding apparatus of the portable welding arrangement, it is advantageous if the battery is connected to a cooling device. Thereby the heat losses from the batteries can be dissipated via corresponding ventilators, heat sinks and/or also liquid-cooled systems.

The object according to the invention is also solved by an above-mentioned method for operating a portable welding arrangement, wherein the charge or charging of the battery is con-trolled by the charge controller of the charger in accordance with the operating mode of the welding apparatus. With respect to the advantages obtainable therefor and possible optional features, reference is made to the above description of the portable welding arrangement.

Now the present invention will be described in more detail by means of the attached drawings which show embodiments of the invention, wherein.

Figure 1:
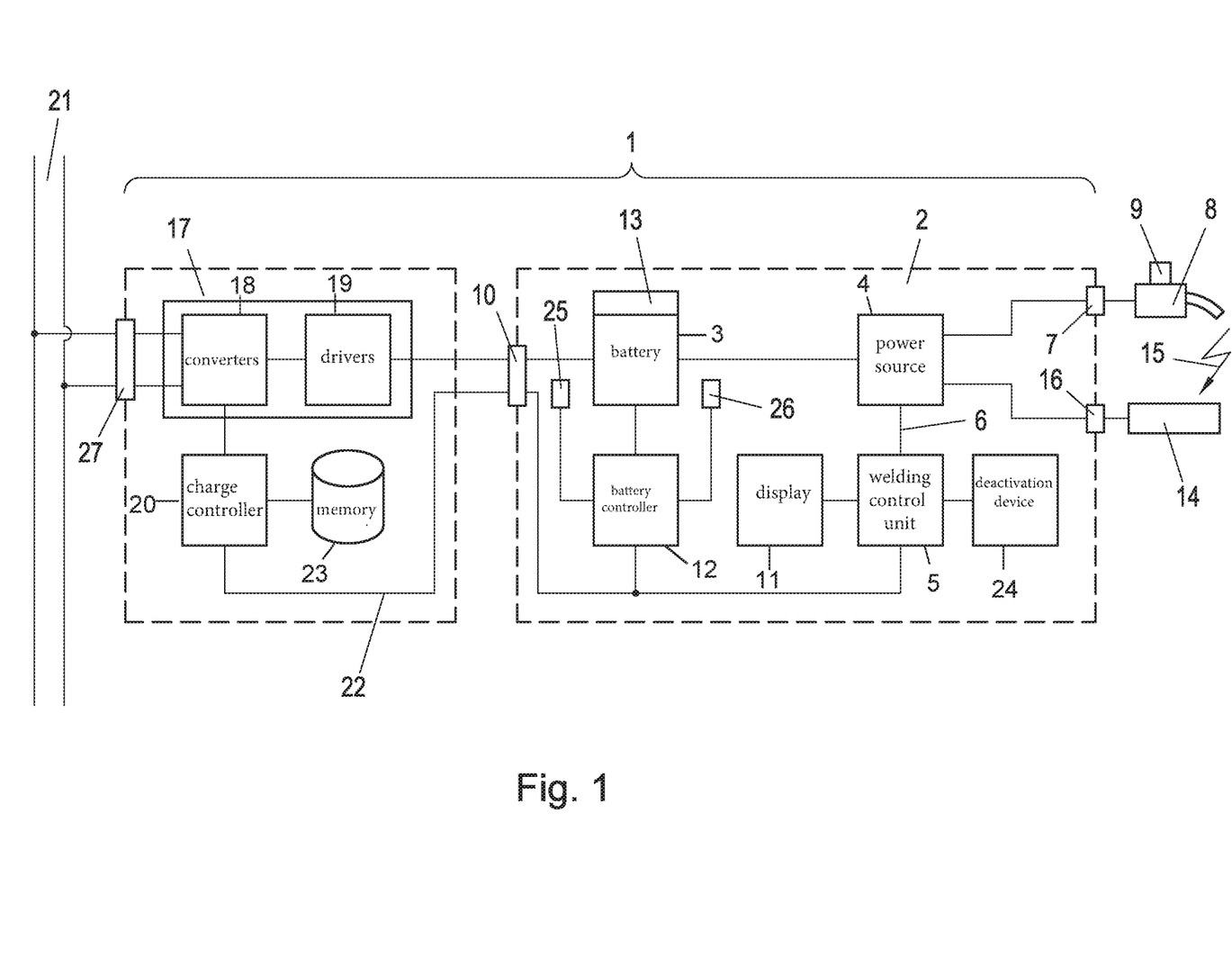
FIG. 1 shows a block diagram of a portable welding arrangement in accordance with the present patent application.

FIG. 1 shows a block diagram of an embodiment of a portable welding arrangement 1 in accordance with the present invention, said portable welding arrangement 1 comprising a welding apparatus 2 having at least one battery 3, a power source 4 or a DC/DC converter, and a welding control unit 5, which are connected via a corresponding line 6 for an analog or digital communication with each other. It goes without saying that the driving or the control of the power source 4 can also be carried out via transformers, gate drivers and/or similar circuits—as are generally known from the state of the art. A welding torch 8 can be connected to the welding apparatus 2 via a connection 7. In dependence on the used welding method, also a welding wire and a cooling medium can be guided from the welding apparatus 2 to the welding torch 8. Via an operating element 9 at the welding torch 8 the operating mode of the welding apparatus 2 can be changed between a standby mode and a welding mode. The operating element 9 is not mandatory. The changing between the standby mode and the welding mode can also be carried out by a contact ignition in that the welding torch 8 is put on at the pertaining work piece 14 and the electric arc 15 is automatically ignited. The electric arc 15 will be extinguished by the removal of the welding torch 8 from the work piece 14. The change can, of course, also be carried out at the welding apparatus 2.

Furthermore, the welding apparatus 2 has a charging connection 10 via which the welding apparatus 2 can be connected to a charger 17 so that the battery 3 can be charged. A display 11 which is connected to the welding control unit 5 of the welding apparatus 2 provides the welder with important information, in particular also on the state of charge of the battery 3.

Preferably, also a battery controller 12 is included in the welding apparatus 2 and/or integrated in the battery 3, said battery controller 12 accomplishing the optimum control of the battery 3. For instance, in dependence on the type of the battery 3 a variable control of the battery 3 can be carried out. For this purpose, a battery identification 13 can be provided which, for instance, can be formed and included by a memory attached at the battery 3 or by an RFID (Radio Frequency Identification) label.

The work pieces 14 which are to be welded together are connected to a connection to ground 16 of the welding apparatus 2 via a corresponding line.

The charger 17 is composed of corresponding converters 18 and drivers 19 which form the power element and which transform the energy originating from the power supply network or grid 21 into the voltage required for charging the battery 3 and into the required current. The charging method of the charger 17 will be specified via a charge controller 20.

According to the invention, the charge controller 20 of the charger 17 is connected to the welding control unit 5 of the welding apparatus 2 via a communication link 22. Thereby it is possible that the charging of the battery 3 of the welding apparatus 2 can be carried out in accordance with the operating mode of the welding apparatus 2. The battery controller 12 already mentioned above can also be connected to the welding control unit 5 and to the charge controller 20 via a communication link 22. As already mentioned above, the communication link 22 can be implemented by a wireless or a wire- or line-bound link or can be accomplished also by a corresponding modulation of a present energy or supply line. In case of a wire- or line-bound communication link 22, the connection is effected preferably via the charging connection 10.

The communication link can also be realized such that the charger 17 provides a voltage level to the battery controller 12 so that the battery controller 12 recognizes the presence of the charger 17. In this way the battery controller 12 can also be activated when the welding apparatus 2 is turned off.

The battery controller 12 can also recognize the presence of the charger 17 on its own—i.e. also without any communication link. This is for instance carried out such that a charging current of the charger 17 is measured by the battery controller 12. Accordingly, the battery controller 12 can also be activated again in this manner when the welding apparatus 2 is turned off.

In a memory 23 in the charger 17 there can be stored charging characteristics or charging parameters by means of which the charge controller 20 selects the respectively suitable charging method for the charging of the battery 3 of the welding apparatus 2 in accordance with the operating mode of the welding apparatus 2. For instance, in the memory 23 there can be stored at least one respective charging characteristic according to which the battery 3 is to be charged in the standby mode of the welding apparatus 2. In the welding mode, the charging characteristic is adapted correspondingly to the set welding current. Thus, on the one hand, the welding current is withdrawn from the battery 3, and, at the same time, the battery 3 is charged. On the other hand, a maximum welding current is directly made available by the charger 17 when it is connected to the welding apparatus 2.

Furthermore, in the welding apparatus 2 there can be included a deactivation device 24 which is connected to the welding control unit 5 and which turns the welding apparatus 2 off when a predetermined period of time Δt is exceeded in the standby mode. In this way, the energy of the battery 3 can be saved when the welding apparatus 2 is not operated.

A temperature sensor 25 can measure the temperature of the battery 3 and can forward said temperature to the battery controller 12 or also to the welding control unit 5. Heat losses from the battery 3 can be dissipated via a cooling device 26 which can be of various designs.

Figure 2:
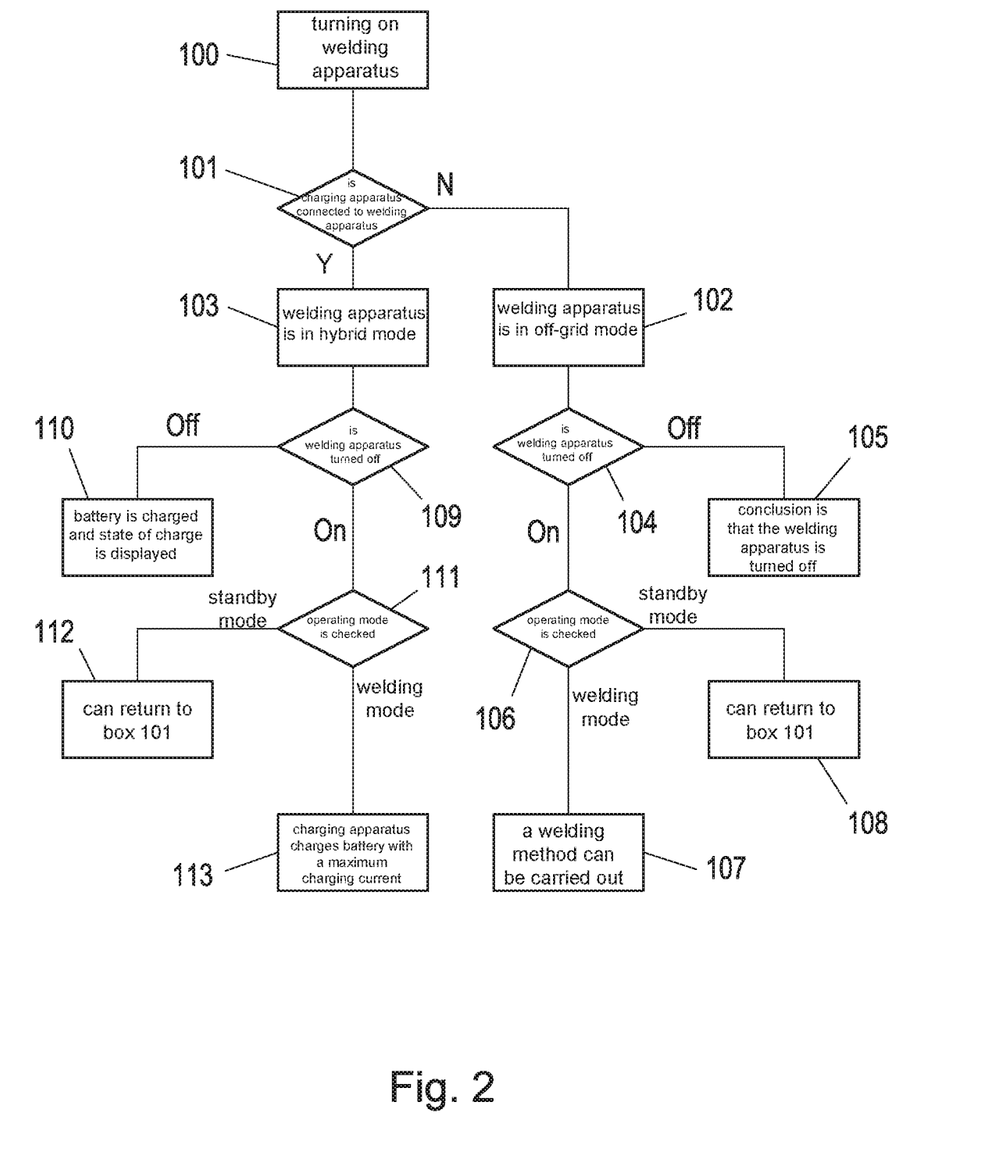
FIG. 2 shows a flow chart for the illustration of an embodiment of a method for operating a portable welding arrangement in accordance with the present patent application.

FIG. 2 shows a block diagram for the illustration of the method for operating a portable welding arrangement 1 in accordance with the present application. Said method can for instance be implemented by means of software technology in the welding control unit 5, wherein this is also practicable in the battery controller 12 or in the charge controller 20. According to block 100, the method will be started and initiated when the welding apparatus 2 will be turned on. In the question 101 it is checked whether the charging apparatus charger is connected to the welding apparatus. If the charger 17 is not connected to the welding apparatus 2, the welding apparatus 2 is in the off-grid mode (block 102). When it is recognized that the charging device 17 is connected to the welding apparatus 2, the welding apparatus 2 is in the so-called hybrid mode (block 103). In the off-grid mode it is checked by means of the question 104 whether the welding apparatus 2 is turned off, which can for instance be effected automatically when a predetermined period of time is exceeded in the standby mode. If it is determined that the welding apparatus 2 is turned off, it is proceeded to block 105. If the welding apparatus is not turned off, according to question 106 the operating mode of the welding apparatus 2 is checked, and in case of the standby mode it is branched to block 108, and in case of the welding mode it is branched to block 107. Correspondingly, according to block 107 a welding method can be carried out.

In this connection, the questioning according to block 101 is for instance carried out such that the charger 17 transmits the presence via the communication link 22 at least to the battery controller 12.

In the so-called hybrid mode, i.e. when the charger is connected, it is checked by means of question 109 whether the charger 2 is turned off; if so, then it is proceeded with block 110—which means that the battery 3 will be charged and the state of charge will be displayed. If the welding apparatus 2 is not turned off, the operating mode of the welding apparatus 2 is checked according to question 111, and in case of the standby mode it is branched to block 112, and in case of the welding mode it is branched to block 113. The checking of the operating mode of the welding apparatus can for instance be carried out via the measurement of the welding current. If the welding apparatus is in the welding mode with the charger being connected thereto (block 113), the charger is instructed to carry out the charging of the battery 3 with a maximum possible charging current. The charger 17 can of course determine the operating mode also independently—i.e. also without the communication link 22—by evaluating a voltage and current profile of the battery 3 at the start of the welding process, i.e. for instance by detecting a voltage drop. Here, the voltage and current profile is detected via the charging lines which are connected to the charging connection 10. Thus it is switched by the charger 17 from a normal charging characteristic to the characteristic for the hybrid mode.

If the welding apparatus is in the standby mode with the charger being connected thereto (block 112), the charging of the battery is carried out according to a specified charging characteristic. Additionally, in the welding mode there could still be measured the magnitude of the welding current, and, for instance in case of a low welding current, the charging of the battery could also be carried out with a specified charging characteristic, whereas, when a predetermined welding current is exceeded, the charging is carried out with a maximum possible charging current. After the blocks 107, 108, 112, and 113 it will normally again be returned to question 101.

The described method can also be modified to more welding characteristics in dependence on different welding states and can be implemented by software technology.

Figure 3:
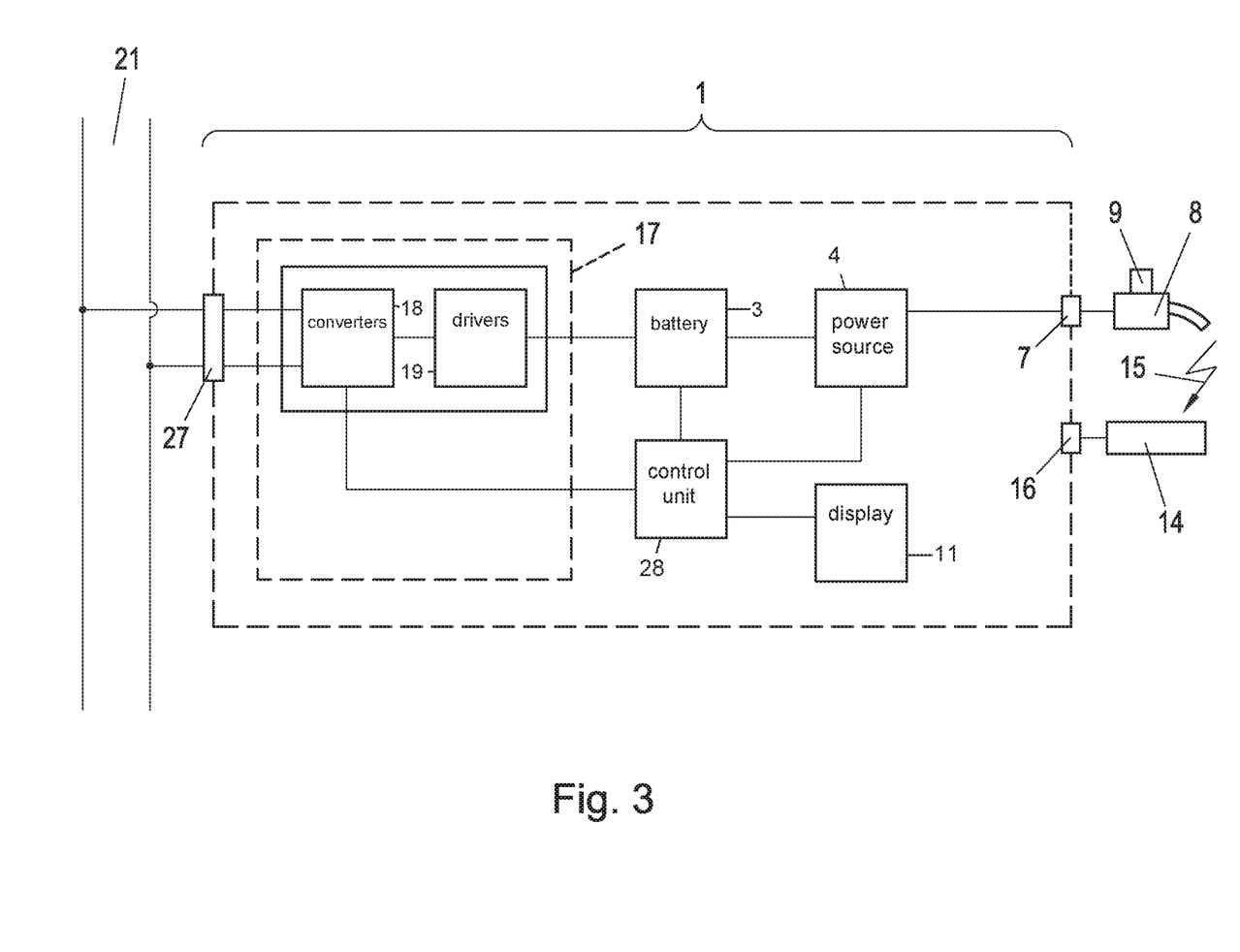
FIG. 3 shows an alternative embodiment of a portable welding arrangement comprising an integrated charger.

FIG. 3 now shows a form of a portable welding arrangement 1 which is modified as compared to FIG. 1, wherein in said portable welding arrangement 1 the charger 17 is integrated in the welding apparatus 2. In addition to the above-described components, the welding apparatus now has a grid or network connection 27 for connecting the converter 18 (or the power element) of the charger 17 to the power supply network or grid 21. In the represented variant of the embodiment, the welding control unit 5, the charge controller 20 and the battery controller 12 are combined in one common control unit 28.

Figure 4:
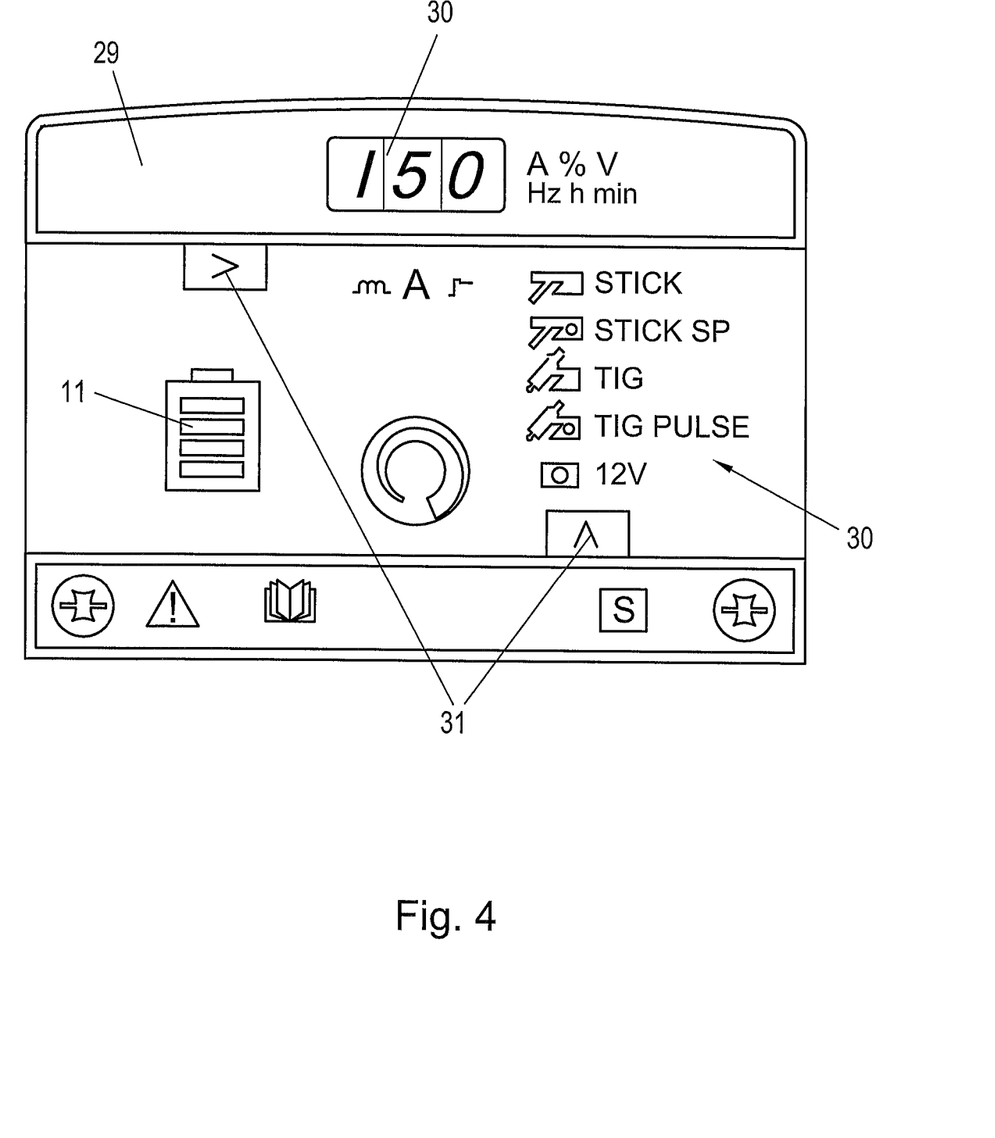
FIG. 4 shows an input/output panel of a welding apparatus of a portable welding arrangement.

Now, FIG. 4 shows a variant of an embodiment of an input/output panel 29 of a welding apparatus 2 of a portable welding arrangement 1 according to the present application, which variant, apart from a display 11 for displaying the state of charge of the battery 3, also includes various parameter displays 30 and an operating element 31 for changing welding parameters, as for instance the welding current. It is of importance that the welder is provided with information on the state of charge of the battery 3 via the display 11 so that the welder can adapt the welding processes to the state of charge of the battery 3.

The invention claimed is:

1. A portable welding arrangement comprising:
   a battery-powered welding apparatus having a storage battery, a power source, a welding control unit, and a connection for a welding torch, wherein the operating mode of the welding apparatus is changeable between a standby mode and a welding mode, and
   a charger that is connectable to a power supply network and to the welding apparatus and has a charge controller for charging the storage battery,
   wherein a welding current is withdrawn from the storage battery,
   wherein the charge controller of the charger is designed to control the charge or charging of the storage battery of the welding apparatus in accordance with the operating mode of the welding apparatus,
   wherein the charge controller of the charger is connected to a memory for storing at least one charging characteristic and is designed to control the charge or charging of the storage battery in the standby mode of the welding apparatus in accordance with the at least one charging characteristic and in the welding mode of the welding apparatus in accordance with a charging current being dependent on the welding current, and
   wherein the charged storage battery of the battery-powered welding apparatus provides energy for generating an electric arc for welding even when the charger and the welding apparatus are not connected to the power supply network or to a grid.

2. The portable welding arrangement according to claim 1, wherein the welding control unit is connected to the charge controller of the charger via a communication link.

3. The portable welding arrangement according to claim 1, wherein the charge controller of the charger is designed to control the charge or charging of the storage battery of the welding apparatus in accordance with characteristics of the storage battery.

4. The portable welding arrangement according to claim 1, wherein the charge controller of the charger is designed to control the charge or charging of the storage battery in accordance with a maximum charging current in the welding mode of the welding apparatus.

5. The portable welding arrangement according to claim 1, wherein within the welding apparatus there is provided a storage battery controller for monitoring the state of charge of the storage battery, said storage battery controller being connected to the welding control unit via a communication link.

6. The portable welding arrangement according to claim 1, wherein the welding apparatus comprises a display for displaying the state of charge of the storage battery.

7. The portable welding arrangement according to claim 1, wherein within the welding apparatus there is formed a deactivation device for turning the welding apparatus off after the exceeding of a predetermined period of time in the standby mode.

8. The portable welding arrangement according to claim 1, wherein a temperature sensor for measuring the temperature of the storage battery is provided, said temperature sensor being connected to the storage battery controller.

9. The portable welding arrangement according to claim 1, wherein the charging apparatus is integrated in the welding apparatus.

10. The portable welding arrangement according to claim 1, wherein the storage battery is connected to a cooling device.

11. A method for operating a portable welding arrangement comprising a battery-powered welding apparatus having a storage battery, a power source, a welding control unit, and a connection for a welding torch, the method comprising steps of:
    changing an operating mode of the welding apparatus between a standby mode and a welding mode,
    connecting the storage battery of the welding apparatus to a charger connected to a power supply network,
    withdrawing a welding current from the storage battery during the welding mode,
    charging the storage battery via the charger, and
    controlling, via a charge controller of the charger, the charging of the storage battery in accordance with an operating mode of the welding apparatus such that:
      in the standby mode of the welding apparatus the charging occurs in accordance with at least one specified charging characteristic stored in a memory connected to the charging controller and
      in the welding mode of the welding apparatus the charging occurs in accordance with a charging current dependent on the welding current,
    wherein the charged storage battery of the battery-powered welding apparatus provides energy for generating an electric arc for welding even when the charger and the welding apparatus are not connected to the power supply network or to a grid.

12. The method according to claim 11, further comprising a step of:
    transmitting the operating mode of the welding apparatus from the welding control unit to the charge controller of the charger via a communication link.

13. The method according to claim 11, further comprising a step of:
    detecting the operating mode of the welding apparatus by the charger via measurement of a voltage and current profile.

14. The method according to claim 11, further comprising a step of:
    controlling the charge or charging of the storage battery by the charge controller of the charger in accordance with characteristics of the storage battery.

15. The method according to claim 12, further comprising steps of:
    recognizing the presence of the charger via the communication link, and transmitting the presence of the charger to the welding control unit.

16. The method according to claim 11, wherein the storage battery is charged in the welding mode of the welding apparatus with a maximum possible charging current.

17. The method according to claim 11, further comprising steps of:
  monitoring via a storage battery controller in the welding apparatus the state of charge of the storage battery, and
  displaying the state of charge.

18. The method according to claim 11, further comprising a step of:
  turning off the welding apparatus after the exceeding of a predetermined period of time in the standby mode.

19. The method according to claim 11, further comprising steps of:
  measuring via a temperature sensor the temperature of the storage battery, and
  forwarding the temperature of the storage battery to at least one of the storage battery controller and the welding control unit.

20. The method according to claim 17, wherein the state of charge of the storage battery is displayed on a display of the welding apparatus.

* * * * *

UNITED STATES PATENT AND TRADEMARK OFFICE
CERTIFICATE OF CORRECTION

PATENT NO. : 10,688,584 B2
APPLICATION NO. : 14/419532
DATED : June 23, 2020
INVENTOR(S) : Starzengruber et al.

Page 1 of 1

It is certified that error appears in the above-identified patent and that said Letters Patent is hereby corrected as shown below:

On the Title Page

Left column, item (71): Please change "Pattenbach" to correctly read --Pettenbach--.

Signed and Sealed this
Twenty-eighth Day of July, 2020

Andrei Iancu
*Director of the United States Patent and Trademark Office*